United States Patent [19]

Mashburn et al.

[11] 4,016,768
[45] Apr. 12, 1977

[54] TRAVERSING PROBE SYSTEM

[75] Inventors: Douglas N. Mashburn, Knoxville;
Richard H. Stevens, Oak Ridge;
Harold C. Woodall, Kingston, all of Tenn.

[73] Assignee: The United States of America as represented by the United States Energy Research and Development Administration, Washington, D.C.

[22] Filed: Mar. 15, 1976

[21] Appl. No.: 667,005

[52] U.S. Cl. .................................. 74/23; 74/56
[51] Int. Cl.² ................................. F16H 21/00
[58] Field of Search ............................ 74/23, 56

[56] References Cited
UNITED STATES PATENTS

| | | | |
|---|---|---|---|
| 1,323,536 | 12/1919 | McDaniel et al. | 74/25 |
| 1,490,656 | 4/1924 | Bignan | 74/56 |
| 2,780,421 | 2/1957 | Herr | 74/56 |
| 2,791,121 | 5/1957 | Morrill | 74/23 |
| 3,785,212 | 1/1974 | Eminger | 74/23 |

*Primary Examiner*—Samuel Scott
*Assistant Examiner*—Wesley S. Ratliff, Jr.
*Attorney, Agent, or Firm*—Dean E. Carlson; David S. Zachry; Fred O. Lewis

[57] ABSTRACT

This invention comprises a rotatable annular probe-positioner which carries at least one radially disposed sensing probe, such as a Pitot tube having a right-angled tip. The positioner can be coaxially and rotatably mounted within a compressor casing or the like and then actuated to orient the sensing probe as required to make measurements at selected stations in the annulus between the positioner and compressor casing. The positioner can be actuated to (a) selectively move the probe along its own axis, (b) adjust the yaw angle of the right-angled probe tip, and (c) revolve the probe about the axis common to the positioner and casing. A cam plate engages a cam-follower portion of the probe and normally rotates with the positioner. The positioner includes a first-motor-driven ring gear which effects slidable movement of the probe by rotating the positioner at a time when an external pneumatic cylinder is actuated to engage the cam plate and hold it stationary. When the pneumatic cylinder is not actuated, this ring gear can be driven to revolve the positioner and thus the probe to a desired circumferential location about the above-mentioned common axis. A second motor-driven ring gear included in the positioner can be driven to rotate the probe about its axis, thus adjusting the yaw angle of the probe tip. The positioner can be used in highly corrosive atmosphere, such as gaseous uranium hexafluoride.

10 Claims, 6 Drawing Figures

TRAVERSING PROBE SYSTEM

This invention was made in the course of, or under, a contract with the U.S. Energy Research and Development Administration.

BACKGROUND OF THE INVENTION

This invention relate generally to probe-carrying apparatus for positioning a sensing probe as required to make gas-pressure measurements or the like. More particularly, it relates to probe-carrying apparatus for selectively rotating, reciprocating, and revolving a probe carried thereby.

In modern gaseous diffusion plants for the separation of uranium isotopes, gaseous uranium hexafluoride ($UF_6$) is circulated through the separation stages by large axial flow compressors. The typical compressor includes a cylindrical casing which houses the rotor-and-stator assembly. The casing is formed with an end inlet and a side inlet for the admission of $UF_6$ and with an end outlet for discharge of the same. The inlet and outlet ducts are disposed substantially normal to the casing, since the $UF_6$ must be turned through an angle of about 90° as it enters and leaves the casing. Improvement of the designs of the compressor inlets and outlets depends to a large extent on how accurately $UF_6$ pressure, temperature, and the like can be determined with the compressor casing under actual operating conditions. The probe positioner of this invention is designed to be mounted within the casing and to orient a sensing probe as required to determine various $UF_6$ parameters while the compressor is being operated in a test loop. The positioner comprises a probe-carrying assembly which is mounted coaxially within the compressor casing and which can be actuated to position a sensing probe in various measuring stations in an annular region extending between the positioner and the casing. Positioning of the probe is effected by selectively moving it along its axis, rotating it about its axis, and revolving it about an axis of the positioner.

SUMMARY OF THE INVENTION

It is an object of this invention to provide improved probe-positioning apparatus.

It is another object to provide apparatus for selectively rotating, reciprocating, and revolving an elongated sensing probe carried thereby.

It is another object to provide a rotatable probe-carrying assembly for selectively rotating the probe about its axis, retracting or extending the probe along its axis, and revolving the probe about the axis of rotation of the assembly.

It is still another object to provide a probe-positioning assembly suitable for long-term use in a corrosive $UF_6$ environment.

Other objects will be made apparent hereinafter.

BRIEF DESCRIPTION OF THE DRAWINGS

FIGS. 4A and 4B are front and side views, respectively, of the tip of a pressure sensing probe for use in the assembly shown in FIGS. 1 and 2.

This invention can be summarized as follows: Probe positioning apparatus comprising (a) a member having a surface of revolution; (b) means for rotating said member about its axis of revolution; (c) a sensing probe mounted to said member and disposed normal to said axis of revolution, said probe being slidable along its axis and rotatable about the same; (d) means for rotating said probe about its axis; (e) a cam plate carried by said member and in engagement with said probe for imparting slidable movement to said probe; and (f) means for selectively engaging said cam plate to prevent rotation of the same about its axis and disengaging said cam plate to permit rotation of the same about its axis.

DESCRIPTION OF THE PREFERRED EMBODIMENT

Although this invention is generally applicable to the positioning and orientation of various types of sensing probes, for brevity it will be illustrated for measuring gas pressures at various locations within the inlet end of an axial flow compressor assembly of the kind described briefly above. This is, the probe positioner to be described is coaxially mounted within the compressor casing immediately upstream of the rotor-and stator assembly.

Figure 1:
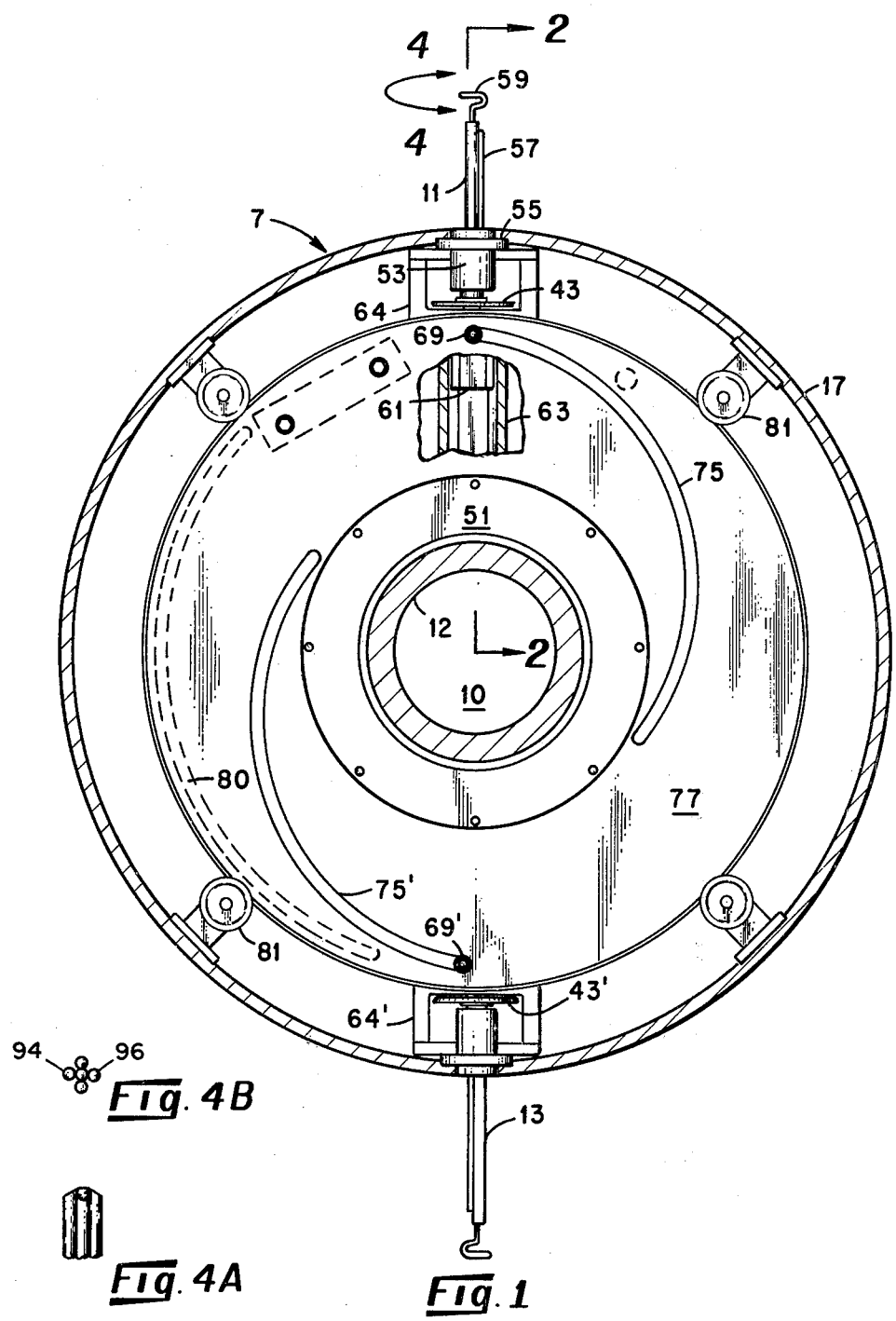
FIG. 1 is a transverse sectional view of an annular probe-carrying assembly designed in accordance with this invention. A cam plate 77 and bracket 63 are partly cut away to show a bearing 61.
Figures 2, 3:
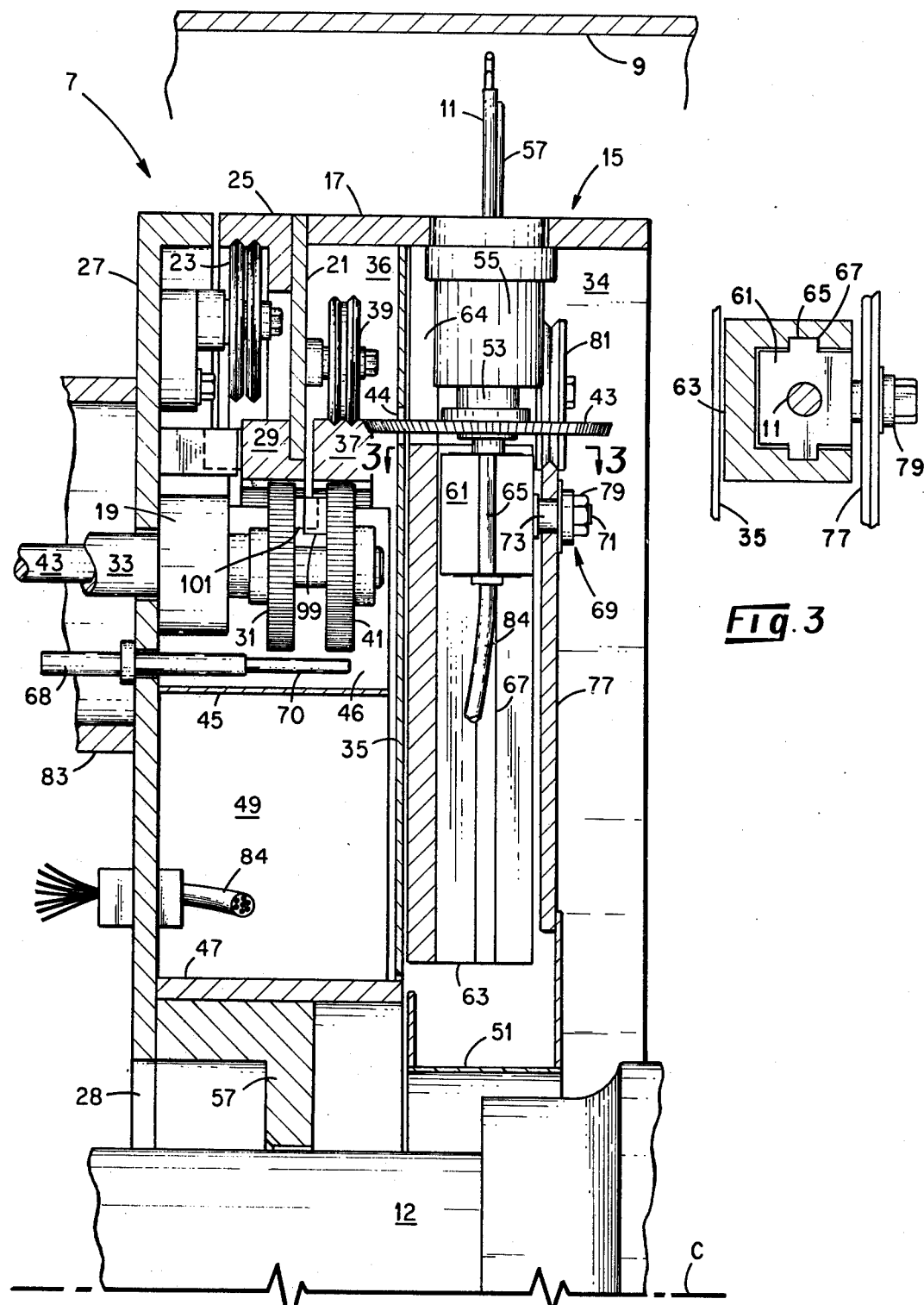
FIG. 2 is an axial sectional view of the same assembly, taken along lines 2—2.
FIG. 3 is a fragmentary cross-sectional view of a cam plate and cam-follower guide assembly shown in FIGS. 1 and 2.

Referring to FIGS. 1 and 2, the invention includes an annular drum assembly 7 which is coaxially mounted within a compressor casing 9 having an axis of revolution C (FIG. 2). The assembly 7 has a central aperture 10 for free passage of the compressor drive shaft 12 (not shown in FIG. 1). Incorporated in the assembly are two oppositely disposed, radially extending sensing probes 11, 13. As will be described, the drum assembly 7 can be rotated about the axis C to position the sensing probes circumferentially about that axis.

Still referring to FIGS. 1 and 2, the drum assembly 7 includes a drum 15 defined by a sleeve 17 and an annular plate 21. The assembly 7 is rotatably supported by a plurality of rollers 23 (FIG. 2), only one of which is shown. The rollers supportably engage an annular grooved shoulder 25 on the drum 15. The rollers are mounted on shafts affixed to a stationary bulkhead 27 having a central opening 28 for passage of the compressor shaft. As shown in FIG. 2, an internal ring gear 29 is affixed to the inner circumference of the plate 21 and is meshed with a drive gear 31. The gear 31 is mounted on a drive shaft 33 which extends through a $UF_6$/air seal 19 and through bearings in the support plate 27. Rotation of the shaft 33 turns the drum assembly 7 to sweep, or revolve, the probes 11, 13 about the axis C.

As shown in FIG. 2, the drum 15 includes an annular shroudplate 35 whose outer edge is affixed to the sleeve 17. Also mounted in the drum is an internal ring gear 37 which is similar in design to the ring gear 29 and positioned coaxial therewith. The ring gear 37 is exteriorly supported by rollers 39, only one of which is shown; these are mounted on shafts affixed to the plate 21. As indicated, the outer face of the ring gear 37 is grooved circumferentially for engagement with the rollers 39. The ring gear 37 is meshed with a drive gear 41, which is mounted to a drive shaft 43; this shaft extends coaxially through the aforementioned drive shaft 33 and is provided with a seal preventing UF$_6$ leakage therebetween. As shown, an outer edge of the ring gear 37 is designed as a bevel ring gear which is in mesh with a bevel gear 43 disposed in the compartment 34 but extending into the compartment 36 through an aperture 44 in the plate 35. As shown in FIG. 2, an annular shroud 45 is positioned just inward of the ring gears 29, 37. The rearward edge of the shroud is affixed to the bulkhead 27. The shroud and a ring 47 affixed to bulkhead 27 and plate 35 define a central annular compartment 49, in which is coiled a flexible bundle 84 of tetrafluoroethylene tubes for conveying pressure signals form the probe 11 to an external receiver. The coil is wound or unwound as the drum rotates.

Referring again to the bevel gear 43, this gear is mounted to a radially extending shaft 53 which is rotatably mounted in a bearing 55 affixed to the sleeve 17. The pressure-sensing probe 11 is slidably fitted in the shaft 53 extends therethrough. The probe is keyed to the shaft by means of a spline 57. This arrangement permits the probe to be rotated by the shaft 53 or to be moved axially therein, as will be described. The outer end of the probe terminates in an right-angled tip 59 (FIG. 1). In the illustrated form of the invention the probe-and-tip assembly comprises a tubular casing containing a cluster of individual Pitot tubes. FIGS. 4A, 4B illustrate a probe tip consisting of five individual Pitot tubes extending from the casing. The lip of the central tube is disposed in a plane normal to the axis of the tip, whereas the lips of the other tubes are beveled as shown to lie in planes intersecting that plane at 45°. Using techniques well known in the art, a top of the design shown in FIGS. 4A and 4B can be used to determine direction of gas flow. Each of the Pitot tubes is connected to external instrumentation by the aforementioned tubing 84. It will be apparent from the foregoing that rotation of the aforementioned drive shaft 43 relative to the shaft 33 will rotate the probe 11 via the gears 41, 37, and 43. Assuming that the probe is at a yaw angle of 0°—i.e., that the tip faces directly into the gas flow—the yaw angle can be set to positive or negative values by rotating the shaft 43 relative to shaft 33.

Referring to FIGS. 1-3, the lower end of the probe 11 terminates within and is clamped to a sliding bearing 61 of generally rectangular cross section. The bearing is slidably mounted in an elongated U-shaped channel 63, or bracket, having a bifurcated outer end 64 which is secured to the sleeve 17. The bracket is positioned coaxial with the probe 11. As shown, the bearing 61 is provided with splines 65 which are slidably engaged with grooves 67 in the bracket for guiding the bearing along the axis of the probe. In this particular embodiment, which is designed for use in gaseous UF$_6$, the slider 61 has a hard anodized-aluminum surface and the bracket 63 has a hard electroless-nickel surface. The assembly is designed with generous clearances—as, for instance, from 0.005 inch to 0.010 inch. This combination provides a bearing which is able to operate even with deposits of uranium salts on the surfaces. Because the bearing surfaces are so hard, the salts act as lubricants.

Extending from the front of the bearing 61 is a cam-follower assembly 69 including a lug 71 carrying a needle bearing 73. This assembly is fitted in and extends through a spiral-arc slot 75 (FIG. 1) formed in an annular cam plate 77; the outer end of the lug carries bearing-retaining means 79. The cam plate 77 is positioned coaxial with the sleeve 17 and its outer edge is rotatably supported by rollers 81 affixed to the sleeve. An annular shroud 51 is coaxially mounted to the inner margin of the plate as shown to guide the tube bundle 84 and protect it from the compressor shaft 12. The slot 75 in the cam plate extends from a point close to the outer edge of the cam plate to a point near the inner edge of the same; in the embodiment shown, the angular distance between the ends of the slot is 120°. It will be apparent that if the cam plate 77 is held stationary while the remainder of the drum assembly 7 is rotated, the cam-follower 69 will be driven inward or outward in its guide bracket 63, the direction of movement depending on the direction of drum rotation. As a result, the probe 11 is either radially extended or retracted. In FIGS. 1 and 2, rotation of the drum assembly relative to the cam plate has driven the follower assembly to the outer end of the slot, fully extending the probe.

As just described, radial movement of probe 11 is accomplished by rotating the sleeve 17 via the drive shaft 33, while holding the cam plate stationary. The cam-holding means comprises a standard pneumatic cylinder 68 which is affixed to the bulkhead 27. When actuated, the cylinder advances a stop 70 through a slot 80 (FIG. 1) in the separator plate to engage a lug on the back of the cam plate. The cylinder is deactuated when the probe has been extended or retracted to the desired position.

The second probe 13 (FIG. 1) carried by the sleeve 17 is positioned in an analogous manner to probe 11. That is, the positioner effects simultaneous and similar movements of the probes. The drive arrangement consisting of shafts 33, 43, drive gears 31, 41, and ring gears 29, 37 is common to both probes, whereas probe 13 is provided with its own cam plate slot 75', cam follower assembly 69', bracket assembly 64', and yaw gear 43'. In terms of polar coordinates, the two probes are at identical yaw angles at all times.

Figure 5:
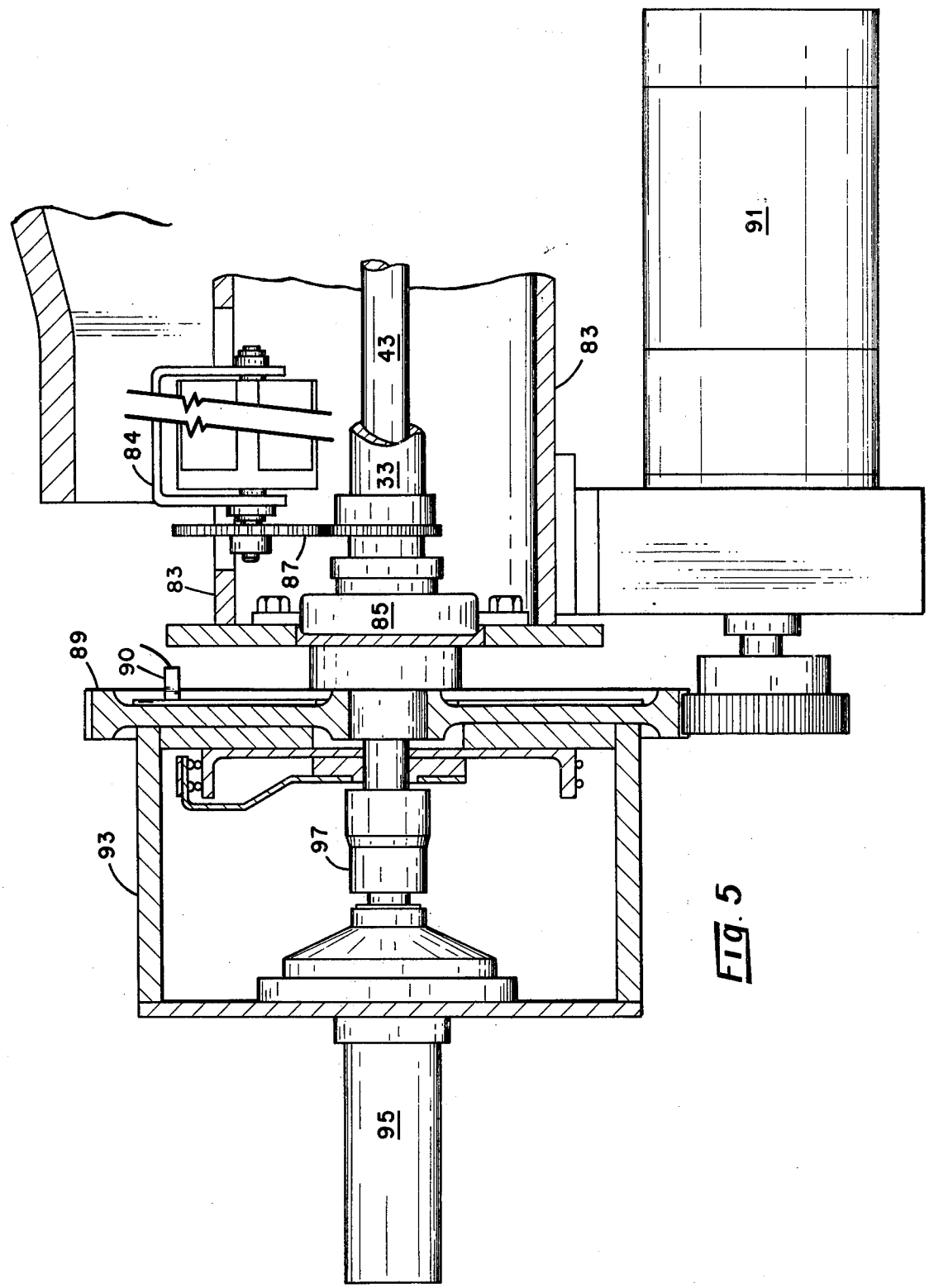
FIG. 5 is a side elevation, partly in section, of an electrical motor and potentiometer arrangement associated with drive shafts 33 and 43, shown in FIG. 2.

Referring to FIG. 5, the drive shafts 33, 43 extend rearwardly through seal assembly 19, plate 27, and a support tube 83 affixed thereto. The outer shaft is journaled in a bearing 85 supported by the tube 83. A gear train 87 couples the outer shaft to a standard multi-turn slidewire potentiometer 84, which is connected to a suitable voltage supply (not shown) and develops an output voltage indicative of the angular position of the probes about the circumference of the drum assembly. The end of the shaft 33 is keyed to a gear 89 driven by an electric motor 91. This "drum" motor rotates the drum assembly 7 (FIGS. 1 and 2). The gear 89 mounted to outer drive shaft 33 is affixed to the case of a slidewire potentiometer 93, which develops an output voltage indicative of the yaw angle of the probes. The case of potentiometer 93 is affixed to the case of an electric motor 95. As a result, the outer drive shaft 33 turns the case of this motor via gear 89 and the case of potentiometer 93. The drive shaft of motor 95 is connected to the aforementioned inner shaft 43 through a coupling 97. This "yaw" motor is provided to rotate the probes 11, 13. The electric motors are d.c. motors of standard design. Electrical connections to the potentiometer 93 and yaw motor 95 are made through brushes contacting slip rings carried by the gear 89. A typical brush 90 is shown.

To summarize, the positioner illustrated in FIGS. 1-4 can be used to selectively extend or retract, rotate, and revolve the probes 11, 13 by energizing one or the other of the drive motors for a selected time. For example, the probes can be extended or retracted to a desired position by (a) energizing motor 91 to rotate the drum assembly 7 in the appropriate direction while (b) actuating the pneumatic cylinder 68 to hold the cam plate 77 stationary for the period of rotation. After the radial positioning, the probes can be moved to the desired circumferential position by energizing the drum motor 91 to rotate the drum assembly 7 (including the cam plate 77) as required. The probes can be set to the desired yaw angle by energizing motor 95 to rotate ring gear 37 in the appropriate direction. The correct yaw position is determined by "hunting" until the pressure signals from two laterally disposed Pitot-tubes (94 and 96, FIG. 4B) are exactly equal.

It will be noted that if the inner shaft 43 were to remain stationary while the drum assembly 7 is rotated to park the probes, the yaw-settings of the probes would be altered; that is, rotation of the drum assembly would cause the bevel gears 43, 43' to walk around the stationary ring gear 37, changing the yaw-angle settings. Such rotation of the bevel gears is prevented by rigidly coupling the outer shaft 33 to the case of the motor 95, as described above, so that they rotate together. As a result, whenever the drum motor 91 drives outer shaft 33 and the drum assembly 7, the inner shaft 43 and ring gear 37 turn at the same rate as the assembly. Thus, during the probe-parking operation, the bevel gears do not rotate the probes and change their yaw-angle settings.

Preferably, the probe positioner is operated by any suitable computer, so that the probes can be positioned in a large number of preselected measuring stations in a comparatively short time. For instance, a positioner of the kind shown in the figures was coupled with a computer (Model 1800, manufactured by International Business Machines, Inc.) and programmed to make 360 determinations throughout an annulus to determine flow direction and magnitude, as well as temperature. These measurements were made in a period of 6 hours. The data so obtained was used in graphs depicting the transverse and axial mass-velocity patterns throughout the annulus.

It will be apparent that it is within the scope of this invention to make various modifications in the illustrative embodiment discussed herein. Various lugs or the like can be incorporated in the assembly shown in FIGS. 1 and 2 to stop the drum assembly in a predetermined position. As an example, a lug 99 (FIG. 2) can be mounted on the drive gear 41 to engage a suitable stop 101 so as to limit travel of the bevel gears and thus impose a maximum on the yaw-angle setting. In that event, the yaw motor 95 would stall when the limit is reached. Stalling could be detected by suitable instrumentation, as by connecting in series with the motor a lamp which would become incandescent under stall conditions and by providing a photo diode for generating a signal when the lamp emits light. If desired, the positioner could be designated so that the probes extend inwardly into the annular region about the compressor shaft 12 (FIG. 1) rather than as shown, thus permitting measurements in that region. It is not essential that the outer drive shaft 33 be coupled to the case of yaw motor 95 to ensure that inner shaft 43 turns with shaft 33. Instead, the two drive motors could be energized simultaneously whenever the drum assembly is to be rotated, although this would require careful synchronization. If desired, the components shown mounted within the sleeve 17 could be mounted to the exterior of the sleeve.

In applications where the positioner is to be exposed to a highly corrosive gas, such as hot $UF_6$, corrosion products may "freeze" the cam plate 77 to its supporting rollers 81. Furthermore, any other exposed bearings may freeze if the positioner is not in frequent use. This problem can be avoided by fabricating one of the bearing surfaces of electroless-nickel-plated steel and the opposing surface of hard anodized aluminum. Referring to FIGS. 2 and 5, it will be noted that all motors and readout potentiometers are located outside the process environment. The compressor shaft 12 is not part of the probe positioner, and where such a shaft is not present the central aperture 10 in the drum assembly may be eliminated. In some instances the periphery of the drum may not comprise a complete circle but rather a portion thereof. Thus, the probe-carrying means can be defined more generally as a member which has a surface of revolution and which is rotatable about an axis thereof.

What is claimed is:
1. Probe positioning apparatus comprising:
   a. a member having a surface of revolution and rotatable about an axis of the same;
   b. a sensing probe mounted to said member and disposed normal to said axis, said probe being slidable along its axis and rotatable about its axis.
   c. a first ring gear rigidly secured to said member and coaxial therewith,
   d. a second ring gear rotatably supported by said member and coaxial therewith,
   e. means coupling said second ring gear and said probe, for rotating said probe about its axis when said second ring gear is rotated,
   f. a cam plate rotatably supported by said member and coupled to said probe, for imparting slidable movement to said probe when said member is rotated relative to said cam plate,
   g. first drive means for rotating said first ring gear, and
   h. second drive means for rotating said second ring gear.

2. The apparatus of claim 1 including means for selectively engaging said cam to prevent the same from rotating with said member and disengaging said cam to permit the same to rotate with said member.

3. The apparatus of claim 1 including a first motor for driving said first ring gear via a first drive shaft.

4. The apparatus of clam 3 including a second motor for driving said second ring gear via a second drive shaft.

5. The apparatus of claim 4 wherein the case of the second motor is connected to the first drive shaft for rotation therewith.

6. The apparatus of claim 5 wherein the first drive shaft and second drive shaft are concentric.

7. Apparatus for positioning a sensing probe by selectively rotating the probe about its own axis, moving the probe along its own axis, and rotating the probe about an external axis comprising:
   a. a sleeve rotatable about its axis,
   b. a probe carried by said sleeve, said probe being rotatable about and movable along its own axis, said probe having a cam-follower portion,
   c. a first ring gear affixed to sleeve and coaxial therewith, d. first drive means for rotating the first gear and thereby rotating said sleeve and said probe about the axis of the sleeve, e. a second ring gear rotatably supported by said sleeve and coaxial therewith, said second ring gear being connected to said probe to rotate the probe about its own axis, f. second drive means for rotating said second ring gear, g. a cam plate rotatably supported by said sleeve and engaged with said cam-follower portion for effecting movement of said probe along its own axis when said sleeve is rotated relative to said cam plate, and h. means for selectively engaging said cam plate to prevent rotation of the same about its axis and disengaging said cam plate to permit rotation of the same about its axis.

8. The combination of claim 7 wherein the first drive means comprises a first motor which is coupled to the first ring gear by means including a first drive shaft and wherein the second drive means comprises a second motor which is coupled to the second ring gear by means including a second drive shaft.

9. The combination of claim 8 wherein the case of the second motor is connected to rotate with the first drive shaft.

10. Probe positioning apparatus comprising:

a. a member having a surface of revolution;

b. means for rotating said member about hts axis of revolution;

b. dmshmf qobe oumsdd o 2aid 4ember ]nd uisposed normal to said axis of revolution, said probe being slidable along its axis and rotatable about the same;

d. means for rotating said probe about its axis;

e. a cam plate carried by said member and in engagement with said probe for imparting slidable movement to said probe; and f. means for selectively engaging said cam plate to prevent rotation of the same about its axis and disengaging said cam plate to permit rotation of the same about its axis.

* * * * *

UNITED STATES PATENT OFFICE
CERTIFICATE OF CORRECTION

Patent No. 4,016,768　　　　　　　　Dated April 12, 1977

Inventor(s) Douglas N. Mashburn, Richard H. Stevens, Harold C. Woodall

It is certified that error appears in the above-identified patent and that said Letters Patent are hereby corrected as shown below:

Column 1, line 8, "relate" should read --relates--
Column 3, line 20, "53 extends" should read --53 and extends--
Column 3, line 33, "top" should read --tip--
Column 5, line 60, "designated" should read --designed--
Column 8, line 8, "hts" should read --its--
Column 8, line 10, "b.　dmshmf qobe oumsdd o 2aid 4ember ]nd uis-"
　should read --c.　a sensing probe mounted to said member and dis- --

Signed and Sealed this

Twenty-fifth Day of October 1977

[SEAL]

Attest:

RUTH C. MASON　　　　　　　LUTRELLE F. PARKER
*Attesting Officer*　　　*Acting Commissioner of Patents and Trademarks*